Patented Sept. 30, 1930

1,777,122

UNITED STATES PATENT OFFICE

HIRSCH LÖWENSTEIN, OF KARLSRUHE, GERMANY

PROCESS OF WORKING ON BERYLLIUM SUBLIMATES CONTAINING SULPHUR AND ALUMINUM WITH A VIEW TO OBTAINING BERYLLIUM COMPOUNDS

No Drawing. Application filed October 8, 1929, Serial No. 398,265, and in Germany September 25, 1928.

This invention relates to a method of working up sublimates obtained from beryl and like silicates and containing beryllium and aluminum and also, usually, sulphur with a view to obtaining pure beryllium compounds.

As I have pointed out in a prior and co-pending application, Serial No. 393,450, filed September 18, 1929, beryllium compounds may be obtained from beryl, phenacite, etc. by subliming out the beryllium in an electric furnace as sulfid or oxid or both. In the process specifically described in that application beryl in admixture with pyrite and carbon is heated in an electric furnace, advantageously under reduced pressure. Silica is reduced to silicon and a body of ferrosilicon is formed, partly at the expense of the iron of the mineral and partly from the pyrite. At the temperatures employed, oxids of beryllium and of aluminum and sulfids of these metals are volatile and vapors are produced containing oxids and sulfids, these vapors being drawn off and condensed. The beryllium compounds being more volatile than the aluminum compounds, fractional condensation is possible. These condensates or sublimates, which may contain beryllium oxid or sulfid or both and aluminum oxid or sulfid or both, are the materials treated in the present invention. The sublimates are of widely varying composition as regards the ratio of beryllium to aluminum. They may run as high as 40 per cent beryllium calculated as BeO. They are fairly pure except as regards aluminum compounds and small amounts of carbon and iron.

According, therefore, to the present invention, these sublimates, for the purpose of separating the beryllium and the aluminum, or of purifying the former respectively, are subjected to extraction with solutions of caustic alkalis or mixtures thereof, sometimes with the addition of alkali sulfids or polysulfids. Advantageously the solutions are hot.

In embodiments of the present invention, the extracts are filtered and treated by a careful addition of acids, for example hydrochloric acid or sulphuric acid. A flake-like deposit is formed, which contains beryllium and sulphur. The aluminum remains wholly or for the most part in the solution. For additional purification of the beryllium precipitate the operation may be repeated, the precipitate being dissolved in caustic alkali solution in the presence of sulfids, etc., but with proper concentration of the original extract and with the use of the proper concentration of the acid this additional purifying operation becomes superfluous.

Other solutions containing beryllium and aluminum in alkali and sulfid solutions may be separated by the addition of acid in the way described.

*Example*

A beryllium sublimate containing sulphur and aluminum and, for example, 40 per cent BeO was boiled with a 35 per cent solution of caustic soda; sufficient being used to dissolve the oxid and sulfid of beryllium and aluminum with some excess to hasten solution. The beryllium and the aluminum were thereby brought into solution, while the iron and the carbon remained undissolved and were removed by filtration.

The filtered solution, which contained $Na_2S$, was treated by careful addition of an acid, in this case 20 per cent hydrochloric acid, at room temperature. Usually in practice treatment is at a higher temperature. Addition of acid was continued as long as the precipitate formed and discontinued at a time when the highly alkaline mother liquor still contained at least six molecules of NaOH for each molecule of $Al_2O_3$ present, thereby leaving the alumina unprecipitated. A deposit was formed containing beryllium and sulphur, and only very little aluminum. The aluminum in the precipitate could be removed practically completely by a repetition of the solution and precipitation. The product thus obtained contains beryllium equivalent to 97 per cent BeO. As stated, contamination of the precipitate with the aluminum may be wholly or practically wholly avoided by correct concentration of the reacting liquids and also by maintaining suitable temperatures in precipitation.

It will be understood that no restriction is made to the specific example quoted, and that various modifications may be made within the meaning of the above and the appended claims without departing from the spirit of the invention.

What I claim is:—

1. The process of treating sublimates containing beryllium, sulphur and aluminum and formed by electric furnace treatment of beryl and like silicates in the presence of carbon and iron which comprises extracting such a sublimate with solution of alkali and carefully adding acid until a precipitate is formed containing practically only beryllium compounds.

2. In the process of claim 1 the improvement which comprises redissolving the precipitate in alkali solutions in the presence of sulfids and repeating the precipitation.

3. The process of treating sublimates containing beryllium, sulphur and aluminum and formed by electric furnace treatment of beryl and like silicates in the presence of carbon and iron which comprises boiling the sublimate with an alkali solution, filtering off undissolved iron and carbon and adding an acid in sufficient quantity to cause the precipitation of beryllium compounds while leaving aluminum componds in solution.

In testimony whereof, I affix my signature.

HIRSCH LÖWENSTEIN.